United States Patent
Ryu et al.

(10) Patent No.: US 10,882,958 B2
(45) Date of Patent: Jan. 5, 2021

(54) POLYAMIDEIMIDE COPOLYMERS AND COLORLESS AND TRANSPARENT POLYAMIDEIMIDE FILM COMPRISING THE SAME

(71) Applicant: LG CHEM, LTD., Seoul (KR)

(72) Inventors: Bi Oh Ryu, Daejeon (KR); Kwan Yeol Paek, Daejeon (KR); Young Ji Tae, Daejeon (KR); Soon Yong Park, Daejeon (KR); Young Seok Park, Daejeon (KR)

(73) Assignee: LG CHEM, LTD., Seoul (KR)

( * ) Notice: Subject to any disclaimer, the term of this patent is extended or adjusted under 35 U.S.C. 154(b) by 42 days.

(21) Appl. No.: 16/320,623

(22) PCT Filed: Nov. 29, 2017

(86) PCT No.: PCT/KR2017/013831
§ 371 (c)(1),
(2) Date: Jan. 25, 2019

(87) PCT Pub. No.: WO2018/117465
PCT Pub. Date: Jun. 28, 2018

(65) Prior Publication Data
US 2019/0153161 A1 May 23, 2019

(30) Foreign Application Priority Data

Dec. 20, 2016 (KR) .................. 10-2016-0174936
Nov. 28, 2017 (KR) .................. 10-2017-0160632

(51) Int. Cl.
*C08G 73/14* (2006.01)
*C08J 5/18* (2006.01)
*C09D 179/08* (2006.01)
*C08G 73/10* (2006.01)

(52) U.S. Cl.
CPC ......... *C08G 73/14* (2013.01); *C08G 73/1039* (2013.01); *C08G 73/1067* (2013.01); *C08J 5/18* (2013.01); *C09D 179/08* (2013.01); *C08J 2379/08* (2013.01)

(58) Field of Classification Search
CPC ...... C08G 73/14; C08J 2379/08; C08L 79/08; C08L 2201/10; C09J 179/08
See application file for complete search history.

(56) References Cited

U.S. PATENT DOCUMENTS

| | | |
|---|---|---|
| 2012/0296050 A1 | 11/2012 | Cho et al. |
| 2014/0072813 A1 | 3/2014 | Fujii et al. |
| 2014/0243482 A1* | 8/2014 | Park .................. C08G 73/1067 525/450 |
| 2016/0075826 A1 | 3/2016 | Sun et al. |
| 2016/0083538 A1* | 3/2016 | Sun ............................ C08J 5/18 528/329.1 |
| 2016/0319076 A1* | 11/2016 | Ju .......................... C08G 73/14 |
| 2018/0044475 A1* | 2/2018 | Park ................... C08G 73/1021 |

FOREIGN PATENT DOCUMENTS

| | | |
|---|---|---|
| EP | 0125599 A2 | 11/1984 |
| JP | S59-204518 A | 11/1984 |
| JP | H07-041559 A | 2/1995 |
| JP | H07-165915 A | 6/1995 |
| JP | 2006-176746 A | 7/2006 |
| JP | 2016-056358 A | 4/2016 |
| KR | 10-2013-0029129 A | 3/2013 |
| KR | 10-2013-0071650 A | 7/2013 |
| KR | 10-1523730 B1 | 5/2015 |
| KR | 10-2015-0076114 A | 7/2015 |
| KR | 10-2015-0077177 A | 7/2015 |
| WO | 2012-144563 A1 | 10/2012 |

OTHER PUBLICATIONS

International Search Report and Written Opinion issued for International application No. PCT/KR2017/013831 dated Feb. 22, 2018, 10 pages.
European Search Report issued for European Patent Application No. 17884529.3 dated Aug. 7, 2019, 5 pages.

* cited by examiner

*Primary Examiner* — Gregory Listvoyb
(74) *Attorney, Agent, or Firm* — Rothwell, Figg, Ernst & Manbeck, P.C.

(57) ABSTRACT

A polyamideimide copolymer which is an imide of a polyamic acid resulting from copolymerizing an aromatic diamine monomer, an aromatic dianhydride monomer, and an aromatic dicarbonyl monomer and a colorless and transparent polyamideimide film including the polyamideimide copolymer. The polyamideimide copolymer according to the present disclosure makes it possible to provide a polyamideimide film exhibiting excellent scratch resistance while being colorless and transparent.

6 Claims, No Drawings

POLYAMIDEIMIDE COPOLYMERS AND COLORLESS AND TRANSPARENT POLYAMIDEIMIDE FILM COMPRISING THE SAME

CROSS-REFERENCE TO RELATED APPLICATION

This application is a 35 U.S.C. § 371 National Phase Entry Application from PCT/KR2017/013831, filed on Nov. 29, 2017, and designating the United States, which claims the benefit of Korean Patent Applications No. 10-2016-0174936 filed on Dec. 20, 2016 and No. 10-2017-0160632 filed on Nov. 28, 2017 with the Korean Intellectual Property Office, the disclosures of which are incorporated herein by reference in their entirety.

TECHNICAL FIELD

The present disclosure relates to a polyamideimide copolymer and a colorless and transparent polyamideimide film including the same.

BACKGROUND OF ART

An aromatic polyimide resin is a polymer mostly having an amorphous structure, and exhibits excellent heat resistance, chemical resistance, electrical properties, and dimensional stability due to its rigid chain structure. The polyimide resin is widely used as an electric/electronic material.

However, the polyimide resin has many limitations in use, because it is dark brown due to the formation of a CTC (charge transfer complex) of 1T electrons present in the imide chain.

In order to solve the limitations and obtain a colorless transparent polyimide resin, a method of restricting the movement of the π T electrons by introducing a strong electron attracting group such as a trifluoromethyl (—CF$_3$) group, a method of reducing the formation of the CTC by introducing a sulfone (—SO$_2$—) group, an ether (—O—) group, or the like into the main chain to make a bent structure, or a method of inhibiting the formation of the resonance structure of the π electrons by introducing an aliphatic cyclic compound, has been proposed.

However, it is difficult for the polyimide resin according to the proposals to exhibit sufficient heat resistance due to the bending structure or the aliphatic cyclic compound, and a film prepared using the same still has limitations such as poor mechanical properties.

On the other hand, in recent years, polyamideimide copolymers having a polyamide unit structure to improve the scratch resistance of polyimide have been developed.

However, the polyamideimide copolymer tends to easily produce haze when a film is formed by coating the same due to its high crystallinity.

Such a haze characteristic of the polyamideimide film is severely manifested and affects the yellow index (YI) as the thickness of the film is thicker, so a method for improving them is required.

DETAILED DESCRIPTION OF THE INVENTION

Technical Problem

The present disclosure is to provide a polyamideimide copolymer exhibiting excellent scratch resistance while being colorless and transparent.

In addition, the present disclosure is to provide a colorless and transparent polyamideimide film including the polyamideimide copolymer.

Technical Solution

The present disclosure provides a polyamideimide copolymer, which is an imide of a polyamic acid resulting from copolymerizing an aromatic diamine monomer, an aromatic dianhydride monomer, and an aromatic dicarbonyl monomer, wherein the aromatic dicarbonyl monomer is contained in an amount of at least 60 mol % based on the total moles of the aromatic dianhydride monomer and the aromatic dicarbonyl monomer, and the aromatic dicarbonyl monomer consists of 10 to 40 mol % of isophthaloyl chloride and 60 to 90 mol % of terephthaloyl chloride.

In addition, the present disclosure provides a polyamideimide film including the polyamideimide copolymer.

Hereinafter, the polyamideimide copolymer and the polyamideimide film according to the exemplary embodiments of the present disclosure will be described in more detail.

In this specification, terms are used merely to refer to specific embodiments, and are not intended to restrict the present disclosure unless this is explicitly expressed.

Singular expressions of the present disclosure may include plural expressions unless it is differently expressed contextually.

The terms "include", "comprise", and the like of the present disclosure are used to specify certain features, regions, integers, steps, operations, elements, and/or components, and these do not exclude the existence or the addition of other certain features, regions, integers, steps, operations, elements, and/or components.

I. Polyamideimide Copolymer

One embodiment of the present disclosure provides a polyamideimide copolymer, which is an imide of a polyamic acid resulting from copolymerizing an aromatic diamine monomer, an aromatic dianhydride monomer and an aromatic dicarbonyl monomer, wherein the aromatic dicarbonyl monomer is contained in an amount of at least 60 mol % based on the total moles of the aromatic dianhydride monomer and the aromatic dicarbonyl monomer, and the aromatic dicarbonyl monomer consists of 10 to 40 mol % of isophthaloyl chloride and 60 to 90 mol % of terephthaloyl chloride.

As a result of further studies by the present inventors, it was confirmed that a copolymer having excellent scratch resistance while being colorless and transparent can be formed, when aromatic dicarbonyl monomers having a specific composition are used to form a polyamideimide copolymer using an aromatic diamine monomer, an aromatic dianhydride monomer, and an aromatic dicarbonyl monomer.

That is, the aromatic dicarbonyl monomer of the specified composition according to the embodiment of the present disclosure can minimize crystallization during copolymerization with aromatic diamine monomers and aromatic dianhydride monomers, enabling the formation of a polyamideimide copolymer exhibiting excellent scratch resistance together with low haze.

According to the embodiment of the present disclosure, the polyamideimide copolymer is an imide of a polyamic acid resulting from copolymerizing an aromatic diamine monomer, an aromatic dianhydride monomer, and an aromatic dicarbonyl monomer.

The polyamic acid may be a block copolymer or a random copolymer.

For example, the polyamic acid block copolymer may have a first unit structure derived from the copolymerization of the aromatic diamine monomer and the aromatic dianhydride monomer, and a second unit structure derived from copolymerization of the aromatic diamine monomer and the aromatic dicarbonyl monomer.

In the polyamic acid random copolymer, the polyamideimide copolymer may have a unit structure in which the aromatic diamine monomer, the aromatic dianhydride monomer, and the aromatic dicarbonyl monomer each form an amide bond and are randomly copolymerized.

This polyamic acid forms a polyamideimide copolymer having an imide bond and an amide bond simultaneously by imidization.

According to an embodiment of the present disclosure, the aromatic dicarbonyl monomer is preferably contained in an amount of at least 60 mol % based on the total moles of the aromatic dianhydride monomer and the aromatic dicarbonyl monomer, in order to form a copolymer exhibiting excellent scratch resistance while being colorless and transparent.

Preferably, the aromatic dicarbonyl monomer may be contained in an amount of 60 mol % or more, 65 mol % or more, or 67 mol % or more based on the total moles of the aromatic dianhydride monomer and the aromatic dicarbonyl monomer.

However, when the aromatic dicarbonyl monomer is used in an excessive amount, problems such as lowered moisture absorbency or opacity may occur. Therefore, it is preferable that the aromatic dicarbonyl monomer is contained in an amount of 90 mol % or less, 85 mol % or less, or 80 mol % or less based on the total moles of the aromatic dianhydride monomer and the aromatic dicarbonyl monomer.

In particular, according to an embodiment of the present disclosure, it is preferable that the aromatic dicarbonyl monomer includes isophthaloyl chloride and terephthaloyl chloride together.

The isophthaloyl chloride and terephthaloyl chloride are compounds in which two carbonyl groups are bonded at the meta or para position with respect to the central phenylene group.

Therefore, it is possible to exhibit an advantageous effect for improving the processability due to the meta bond in the copolymer and for improving the mechanical properties due to the para bond, by applying isophthaloyl chloride together with terephthaloyl chloride as the aromatic dicarbonyl monomer to form a polyamideimide copolymer.

Further, according to an embodiment of the present disclosure, the aromatic dicarbonyl monomer preferably consists of 10 to 40 mol % of isophthaloyl chloride and 60 to 90 mol % of terephthaloyl chloride.

That is, the isophthaloyl chloride and terephthaloyl chloride included in the aromatic dicarbonyl monomer can improve the processability and mechanical properties of the copolymer in the above-mentioned molar ratio, and at the same time, exhibit high hardness and low haze.

Preferably, the isophthaloyl chloride is contained in an amount of 10 mol % or more, or 12 mol % or more, and 40 mol % or less, 35 mol % or less, or 30 mol % or less based on the total moles of the aromatic dicarbonyl monomer. Preferably, the terephthaloyl chloride is contained in an amount of 90 mol % or less, or 88 mol % or less, and 60 mol % or more, 65 mol % or more, or 70 mol % or more based on the total moles of the aromatic dicarbonyl monomer.

As described above, the polyamideimide copolymer according to an embodiment of the present disclosure may exhibit excellent scratch resistance (high grade pencil hardness) and a colorless transparent characteristic (low haze and yellow index), only when the composition of the aromatic dicarbonyl monomer satisfies both of the following two conditions.

(i) The aromatic dicarbonyl monomer should be contained in an amount of at least 60 mol % based on the total moles of the aromatic dianhydride monomer and the aromatic dicarbonyl monomer.

(ii) The aromatic dicarbonyl monomer should consist of 10 to 40 mol % of isophthaloyl chloride and 60 to 90 mol % of terephthaloyl chloride.

According to an embodiment of the present disclosure, as the aromatic diamine monomer and the aromatic dianhydride monomer for forming the polyamideimide copolymer, compounds commonly used in the technical field to which the present invention pertains may be applied without particular limitation.

Specifically, the aromatic diamine monomer may preferably be at least one compound selected from the group consisting of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

More preferably, the aromatic diamine monomer may be 2,2'-bis(trifluoromethyl)-4,4'-biphenyldiamine.

The aromatic dianhydride monomer may preferably be at least one compound selected from the group consisting of 3,3',4,4'-biphenyltetracarboxylic dianhydride, 4,4'-(hexafluoroisopropylidene)diphthalic anhydride, 2,2'-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, cyclobutane-1,2,3,4-tetracarboxylic dianhydride, cyclopentane tetracarboxylic dianhydride, and bis(3,4-dicarboxyphenyl)sulfone dianhydride.

More preferably, the aromatic dianhydride monomer may be cyclobutane-1,2,3,4-tetracarboxylic dianhydride, 3,3',4,4'-biphenyltetracarboxylic acid dianhydride, or a mixture of the same.

Particularly, the aromatic diamine monomer, 2,2'-bis(trifluoromethyl)-4,4'-biphenyldiamine, and an aromatic dianhydride monomer, 3,3',4,4'-biphenyltetracarboxylic acid dianhydride, can be advantageously used for the formation of the polyamideimide copolymer satisfying the above-mentioned characteristics by copolymerizing with the above aromatic dicarbonyl monomer consisting of isophthaloyl chloride and terephthaloyl chloride.

Preferably, the aromatic dicarbonyl monomer is contained in an amount of 30 mol % or more, 35 mol % or more, or 40 mol % or more, and 55 mol % or less, 50 mol % or less, or 45 mol % or less based on the total moles of the aromatic diamine monomer and the aromatic dicarbonyl monomer.

Further, the polymerization conditions for forming the polyamic acid resulting from copolymerizing the aromatic diamine monomer, the aromatic dianhydride monomer, and the aromatic dicarbonyl monomer are not particularly limited.

Preferably, the polymerization for forming the polyamic acid may be carried out by solution polymerization under an inert atmosphere at 0 to 100° C.

In the formation of the polyamic acid, a solvent such as N,N-dimethylformamide, dimethylacetamide, dimethyl sulfoxide, acetone, N-methyl-2-pyrrolidone, tetrahydrofuran, chloroform, gamma-butyrolactone, or the like may be used.

Imidization after the formation of the polyamic acid may be carried out thermally or chemically. For example, compounds such as acetic anhydride, pyridine, and the like may be used for chemical imidization.

According to the embodiment of the present disclosure, the polyamideimide copolymer may have a weight average molecular weight of 10,000 to 1,000,000 g/mol, 50,000 to 1,000,000 g/mol, 50,000 to 500,000 g/mol, or 50,000 to 300,000 g/mol.

II. Polyamideimide Film

According to another embodiment of the present disclosure, a colorless and transparent polyamideimide film including the polyamideimide copolymer is provided.

As described above, as a result of further studies by the present inventors, it was confirmed that a copolymer having excellent scratch resistance while being colorless and transparent can be formed, when aromatic dicarbonyl monomers having a specific composition are used to form a polyamideimide copolymer using an aromatic diamine monomer, an aromatic dianhydride monomer, and an aromatic dicarbonyl monomer.

As a result, the film including the polyamideimide copolymer can be suitably used as a base material for various molded articles requiring colorless transparency as well as excellent scratch resistance. For example, such a polyamideimide film can be applied for substrates for displays, protective films for displays, touch panels, and the like.

The polyamideimide film may be prepared by a conventional method such as a dry method or a wet method using the polyamideimide copolymer. For example, the polyamideimide film may be obtained by coating a solution containing the copolymer on an arbitrary support to form a film, and drying the film by evaporating the solvent from the film. If necessary, stretching and heat treatment for the polyamideimide film may be carried out.

The polyamideimide film may exhibit excellent scratch resistance while being colorless and transparent, because it is prepared using the polyamideimide copolymer.

Specifically, the polyamideimide film may exhibit pencil hardness of at least a 2H grade or at least a 3H grade as measured in accordance with ASTM D3363 with respect to a specimen having a thickness of 30±2 μm.

In addition, the polyamideimide film may have a yellow index (YI) of 3.0 or less, 2.8 or less, 2.75 or less, 2.5 to 2.75, 2.6 to 2.75, or 2.65 to 2.75, as measured in accordance with ASTM D1925 with respect to a specimen having a thickness of 30±2 μm.

In addition, the polyamideimide film may have haze of 0.5% or less, 0.4% or less, 0.1 to 0.5%, 0.2 to 0.5%, or 0.2 to 0.4%, as measured in accordance with ASTM D1003 with respect to a specimen having a thickness of 30±2 μm.

In addition, the polyamideimide film may have transmittance of 88.5% or more, 89% or more, or 88.5 to 89% with respect to visible light having a wavelength of 550 nm in a thickness of 30±5 μm.

In addition, the polyamideimide film may exhibit transmittance of 25% or less, 15% or less, 13% or less, 10 to 25%, or 11 to 25% with respect to ultraviolet light having a wavelength of 388 nm in a thickness of 30±2 μm.

Advantageous Effects

The polyamideimide copolymer according to the present disclosure makes it possible to provide a polyamideimide film exhibiting excellent scratch resistance while being colorless and transparent.

DETAILED DESCRIPTION OF THE EMBODIMENTS

Hereinafter, preferred examples are provided for better understanding. However, these examples are for illustrative purposes only, and the invention is not intended to be limited by these examples.

Example 1

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.4354 g (0.0138507 mol) of 2,2'-bis(trifluoromethyl)-4,4'-biphenyldiamine was added thereto to be completely dissolved. While maintaining the temperature of the solution at 25° C., 0.815 g (0.0027701 mol) of 3,3',4,4'-biphenyltetracarboxylic acid dianhydride was added thereto to be dissolved.

After the temperature of the solution was cooled down to −10° C., 0.2812 g (0.0013851 mol) of isophthaloyl chloride and 1.9684 g (0.0096955 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 188,517 g/mol).

Example 2

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.3448 g (0.0135539 mol) of 2,2'-bis(trifluoromethyl)-4,4'-biphenyldiamine was added thereto to be completely dissolved. While maintaining the temperature of the solution at 25° C., 1.316 g (0.0044728 mol) of 3,3',4,4'-biphenyltetracarboxylic acid dianhydride was added thereto to be dissolved.

After the temperature of the solution was cooled down to −10° C., 0.3302 g (0.0016265 mol) of isophthaloyl chloride and 1.5134 g (0.0074546 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 88,320 g/mol).

Example 3

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.2714 g (0.0133386 mol) of 2,2'-bis(trifluoromethyl)-4,4'-biphenyldiamine was added thereto to be completely dissolved. While maintaining the temperature of the solution at 25° C., 1.2951 g (0.0044017 mol) of 3,3',4,4'-biphenyltetracarboxylic acid dianhydride was added thereto to be dissolved.

After the temperature of the solution was cooled down to −10° C., 0.5524 g (0.0027211 mol) of isophthaloyl chloride and 1.3811 g (0.0068027 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 78,880 g/mol).

Comparative Example 1

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.3619 g (0.0136213 mol) of 2,2'-bis(trifluoromethyl)-4,4'-biphenyldiamine was added thereto to be completely dissolved. While maintaining the temperature of the solution at 25° C., 1.2023 g (0.0040864 mol) of 3,3',4,4'-biphenyltetracarboxylic acid dianhydride was added thereto to be dissolved.

After the temperature of the solution was cooled down to −10° C., 1.9358 g (0.0095349 mol) of terephthaloyl chloride was added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 151,440 g/mol).

Comparative Example 2

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.59 g (0.0143335 mol) of 2,2'-bis(trifluoromethyl)-4,4'-biphenyldiamine was added thereto to be completely dissolved.

After the temperature of the solution was cooled down to −10° C., 1.455 g (0.0071667 mol) of isophthaloyl chloride and 1.455 g (0.0071667 mol) of terephthaloyl chloride were added thereto and stirred to obtain a polymer solution having a solid content of 15 wt %.

Dimethylacetamide was added to the polymer solution to dilute the solid content to 5 wt % or less, and then the solid content was precipitated using 10 L of methanol.

The precipitated solid content was filtered and then dried at 100° C. under vacuum for 6 hours or more to obtain a copolymer in the form of a solid (weight average molecular weight: about 70,174 g/mol).

Comparative Example 3

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.1789 g (0.0130496 mol) of 2,2'-bis(trifluoromethyl)-4,4'-biphenyldiamine was added thereto to be completely dissolved.

While maintaining the temperature of the solution at 25° C., 1.1518 g (0.0039149 mol) of 3,3',4,4'-biphenyltetracarboxylic acid dianhydride and 0.5797 g (0.001304956 mol) of 4,4'-(hexafluoroisopropylidene)diphthalic anhydride were added thereto to be dissolved.

After the temperature of the solution was cooled down to −10° C., 1.5896 g (0.0078297 mol) of terephthaloyl chloride was added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 84,224 g/mol).

Comparative Example 4

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.0105 g (0.0125239 mol) of 2,2'-bis(trifluoromethyl)-4,4'-biphenyldiamine was added thereto to be completely dissolved.

While maintaining the temperature of the solution at 25° C., 1.1054 g (0.0037572 mol) of 3,3',4,4'-biphenyltetracarboxylic acid dianhydride and 1.1127 g (0.0025048 mol) of 4,4'-(Hexafluoroisopropylidene)diphthalic anhydride were added thereto to be dissolved.

After the temperature of the solution was cooled down to −10° C., 1.2713 g (0.006262 mol) of terephthaloyl chloride was added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100 t under vacuum for 6 hours or more to obtain a polyamideimide copolymer in the form of a solid (weight average molecular weight: about 79,427 g/mol).

Comparative Example 5

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.2221 g (0.0131845 mol) of 2,2'-bis(trifluoromethyl)-4,4'-biphenyldiamine was added thereto to be completely dissolved. While maintaining the temperature of the solution at 25° C., 1.9396 g (0.0065922 mol) of 3,3',4,4'-biphenyltetracarboxylic acid dianhydride was added thereto to be dissolved.

After the temperature of the solution was cooled down to −10° C., 0.2677 g (0.0013184 mol) of isophthaloyl chloride and 1.0707 g (0.0052738 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 98,411 g/mol).

Comparative Example 6

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.2221 g (0.0131845 mol) of 2,2'-bis(trifluoromethyl)-4,4'-biphenyldiamine was added thereto to be completely dissolved. While maintaining the temperature of the solution at 25° C., 1.9396 g (0.0065922 mol) of 3,3',4,4'-biphenyltetracarboxylic acid dianhydride was added thereto to be dissolved.

After the temperature of the solution was cooled down to −10° C., 0.5353 g (0.0026369 mol) of isophthaloyl chloride and 0.803 g (0.0039553 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100 t under vacuum for 6 hours or more to obtain a polyamideimide copolymer in the form of a solid (weight average molecular weight: about 87,887 g/mol).

Comparative Example 7

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 4.3619 g (0.01362 mol) of 2,2'-bis(trifluoromethyl)-4,4'-biphenyldiamine was added thereto to be completely dissolved. While maintaining the temperature of the solution at 25° C., 1.2023 g (0.004086 mol) of 3,3',4,4'-biphenyltetracarboxylic acid dianhydride was added thereto to be dissolved.

After the temperature of the solution was cooled down to −10° C., 0.9679 g (0.004767 mol) of isophthaloyl chloride and 0.9679 g (0.004767 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 87,156 g/mol).

Comparative Example 8

In a 1000 mL reactor equipped with a stirrer, a nitrogen injector, a dropping funnel, and a temperature controller, 42.5 g of dimethylacetamide was placed while slowly flowing nitrogen therein, the temperature of the reactor was adjusted to 25° C., and 3.9676 g (0.01239 mol) of 2,2'-bis(trifluoromethyl)-4,4'-biphenyldiamine was added thereto to be completely dissolved. While maintaining the temperature of the solution at 25° C., 3.2808 g (0.01115 mol) of 3,3',4,4'-biphenyltetracarboxylic acid dianhydride was added thereto to be dissolved.

After the temperature of the solution was cooled down to −10° C., 0.1258 g (0.00062 mol) of isophthaloyl chloride and 0.1258 g (0.00062 mol) of terephthaloyl chloride were added thereto and stirred to obtain a polyamic acid solution having a solid content of 15 wt %.

Dimethylacetamide was added to the polyamic acid solution to dilute the solid content to 5 wt % or less, and then the solid content was precipitated using 10 L of methanol.

The precipitated solid content was filtered and then dried at 100° C. under vacuum for 6 hours or more to obtain a polyamideimide copolymer in the form of a solid (weight average molecular weight: about 94,117 g/mol).

TABLE 1

| mol % | TFDB | BPDA | 6FDA | IPC | TPC |
|---|---|---|---|---|---|
| Example 1 | 50.00 | 10.00 | — | 5.00 | 35.00 |
| Example 2 | 50.00 | 16.50 | — | 6.00 | 27.50 |
| Example 3 | 48.92 | 16.14 | — | 9.98 | 24.95 |

TABLE 2

| mol % | TFDB | BPDA | 6FDA | IPC | TPC |
|---|---|---|---|---|---|
| Comparative Example 1 | 50.00 | 15.00 | — | — | 35.00 |
| Comparative Example 2 | 50.00 | — | — | 25.00 | 25.00 |
| Comparative Example 3 | 50.00 | 15.00 | 5.00 | — | 30.00 |
| Comparative Example 4 | 50.00 | 15.00 | 10.00 | — | 25.00 |
| Comparative Example 5 | 50.00 | 25.00 | — | 5.00 | 20.00 |
| Comparative Example 6 | 50.00 | 25.00 | — | 10.00 | 15.00 |
| Comparative Example 7 | 50.00 | 15.00 | — | 17.50 | 17.50 |
| Comparative Example 8 | 50.00 | 45.00 | — | 2.50 | 2.50 |

TFDB: 2,2'-Bis(trifluoromethyl)-4,4'-biphenyldiamine

BPDA: 3,3',4,4'-Biphenyltetracarboxylic acid dianhydride

6FDA: 4,4'-(Hexafluoroisopropylidene)diphthalic anhydride

IPC: Isophthaloyl chloride

TPC: Terephthaloyl chloride

Example 4

The copolymer obtained in the Example 1 was dissolved in dimethylacetamide to prepare a polymer solution of about 25% (w/V). The polymer solution was poured onto a plastic substrate (UPILEX-75s, UBE) and the thickness of the polymer solution was uniformly controlled using a film applicator, dried in a Mathis oven at 80° C. for 10 minutes, and then cured at 250° C. for 30 minutes while flowing nitrogen therein to obtain a polyamideimide film having a thickness of 30 μm peeled from the substrate.

Example 5

A film was obtained in the same manner as in Example 4, except that the copolymer obtained in Example 2 was used in place of the copolymer obtained in Example 1.

Example 6

A film was obtained in the same manner as in Example 4, except that the copolymer obtained in Example 3 was used in place of the copolymer obtained in Example 1.

Comparative Example 9

A film was obtained in the same manner as in Example 4, except that the copolymer obtained in Comparative Example 1 was used in place of the copolymer obtained in Example 1.

Comparative Example 10

A film was obtained in the same manner as in Example 4, except that the copolymer obtained in Comparative Example 2 was used in place of the copolymer obtained in Example 1.

Comparative Example 11

A film was obtained in the same manner as in Example 4, except that the copolymer obtained in Comparative Example 3 was used in place of the copolymer obtained in Example 1.

Comparative Example 12

A film was obtained in the same manner as in Example 4, except that the copolymer obtained in Comparative Example 4 was used in place of the copolymer obtained in Example 1.

Comparative Example 13

A film was obtained in the same manner as in Example 4, except that the copolymer obtained in Comparative Example 5 was used in place of the copolymer obtained in Example 1.

Comparative Example 14

A film was obtained in the same manner as in Example 4, except that the copolymer obtained in Comparative Example 6 was used in place of the copolymer obtained in Example 1.

Comparative Example 15

A film was obtained in the same manner as in Example 4, except that the copolymer obtained in Comparative Example 7 was used in place of the copolymer obtained in Example 1.

Comparative Example 16

A film was obtained in the same manner as in Example 4, except that the copolymer obtained in Comparative Example 8 was used in place of the copolymer obtained in Example 1.

EXPERIMENTAL EXAMPLES

The following characteristics were measured for the films of the Examples 4 to 6 and Comparative Examples 9 to 16, and the results are shown in Tables 3 and 4 below.

(1) Pencil Hardness

The pencil hardness of the films was measured in accordance with ASTM D3363 using a Pencil Hardness Tester. Specifically, pencils of varying hardness values were fixed to the tester and scratched on the film, and the degree of occurrence of scratches on the film was observed with the naked eye or with a microscope. When more than 70% of the total number of scratches were not observed, a value corresponding to the hardness of the pencil was evaluated as the pencil hardness of the film.

(2) Yellow Index (YI)

The yellow index (YI) of the film was measured according to the method of ASTM D1925 using a COH-400 Spectrophotometer (NIPPON DENSHOKU INDUSTRIES).

(3) Transmittance (T)

The total light transmittance of the film was measured using a UV-VIS-NIR Spectrophotometer (SolidSpec-3700, SHIMADZU), and the transmittance with respect to visible light having a wavelength of 550 nm and the transmittance with respect to ultraviolet light having a wavelength of 388 nm are shown in Table 3.

(4) Haze

The haze of the film was measured according to the method of ASTM D1003 using a COH-400 Spectrophotometer (NIPPON DENSHOKU INDUSTRIES).

TABLE 3

|  | Pencil hardness | YI | T (%) @550 nm | T (%) @388 nm | Haze (%) |
|---|---|---|---|---|---|
| Example 4 | 3H | 2.65 | 88.7 | 25.0 | 0.4 |
| Example 5 | 3H | 2.67 | 89.4 | 11.4 | 0.3 |
| Example 6 | 3H | 2.74 | 89.0 | 12.8 | 0.2 |

TABLE 4

|  | Pencil hardness | YI | T (%) @550 nm | T (%) @388 nm | Haze (%) |
|---|---|---|---|---|---|
| Comparative Example 9 | 3H | 3.43 | 88.1 | 10.4 | 1.2 |
| Comparative Example 10 | 6B | 2.08 | 89.1 | 34.8 | 0.2 |
| Comparative Example 11 | H | 2.67 | 88.2 | 13.2 | 0.7 |
| Comparative Example 12 | F | 2.59 | 88.8 | 15.8 | 0.6 |
| Comparative Example 13 | HB | 5.21 | 88.0 | 4.8 | 0.8 |
| Comparative Example 14 | B | 4.81 | 88.1 | 8.8 | 0.7 |
| Comparative Example 15 | 3B | 4.11 | 88.7 | 11.1 | 0.4 |
| Comparative Example 16 | B | 5.28 | 87.9 | 2.1 | 1.0 |

Referring to Tables 3 and 4, it was confirmed that all the films of Examples 4 to 6 exhibited a high pencil hardness of a 3H grade and a low yellow index (YI) of 3.0 or less.

Although the films of Comparative Examples 9 and 11 included a copolymer in which the aromatic dicarbonyl monomer was contained in an amount of 60 mol % or more based on the total moles of the aromatic dianhydride monomer and the aromatic dicarbonyl monomer, it was found that they exhibited a higher yellow index, higher haze, or lower pencil hardness than the films of the examples, because the copolymer included only terephthaloyl chloride as the aromatic dicarbonyl monomer.

In addition, although the films of Comparative Examples 13 and 16 included a copolymer to which isophthaloyl chloride and terephthaloyl chloride were applied as the aromatic dicarbonyl monomer, it was found that they exhibited a higher yellow index, higher haze, or lower pencil hardness than the films of the examples, because the composition of the aromatic dicarbonyl monomer did not satisfy the composition according to the embodiment of the present disclosure.

The invention claimed is:

1. A polyamideimide copolymer, which is an imide of a polyamic acid resulting from copolymerizing an aromatic diamine monomer, an aromatic dianhydride monomer, and an aromatic dicarbonyl monomer,
   wherein the aromatic dicarbonyl monomer is contained in an amount of 65 to 90 mol % based on the total moles of the aromatic dianhydride monomer and the aromatic dicarbonyl monomer,
   wherein the aromatic dicarbonyl monomer is contained in an amount of 40 to 55 mol % based on the total moles of the aromatic diamine monomer and the aromatic dicarbonyl monomer, and
   wherein the aromatic dicarbonyl monomer consists of 10 to 29 mol % of isophthaloyl chloride and 71 to 90 mol % of terephthaloyl chloride.

2. The polyamideimide copolymer of claim 1,
   wherein the aromatic diamine monomer is at least one compound selected from the group of 2,2'-bis(trifluoromethyl)-4,4'-biphenyldiamine, 4,4'-diaminodiphenyl sulfone, 4,4'-(9-fluorenylidene)dianiline, bis(4-(4-aminophenoxy)phenyl)sulfone, 2,2',5,5'-tetrachlorobenzidine, 2,7-diaminofluorene, 4,4-diaminooctafluorobiphenyl, m-phenylenediamine, p-phenylenediamine, 4,4'-oxydianiline, 2,2'-dimethyl-4,4'-diaminobiphenyl, 2,2-bis[4-(4-aminophenoxy)phenyl]propane, 1,3-bis(4-aminophenoxy)benzene, and 4,4'-diaminobenzanilide.

3. The polyamideimide copolymer of claim 1,
   wherein the aromatic dianhydride monomer is at least one compound selected from the group of 3,3',4,4'-biphenyltetracarboxylic dianhydride, 4,4'-(hexafluoroisopropylidene)diphthalic anhydride, 2,2'-bis-(3,4-dicarboxyphenyl)hexafluoropropane dianhydride, benzophenone tetracarboxylic dianhydride, pyromellitic dianhydride, benzophenone tetracarboxylic dianhydride, oxydiphthalic anhydride, cyclobutane-1,2,3,4-tetracarboxylic dianhydride, cyclopentane tetracarboxylic dianhydride, and bis(3,4-dicarboxyphenyl)sulfone dianhydride.

4. A polyamideimide film comprising the polyamideimide copolymer of claim 1.

5. The polyamideimide film of claim 4,
   wherein the film has pencil hardness of a 2H grade or more as measured according to ASTM D3363 with respect to a specimen having a thickness of 30±2 μm of, and
   a yellow index (YI) of 3.0 or less as measured according to ASTM D1925.

6. The polyamideimide film of claim 4,
   wherein the film has haze of 0.5% or less as measured according to ASTM D1003 with respect to a specimen having a thickness of 30±2 μm,
   transmittance of 88.5% or more with respect to visible light having a wavelength of 550 nm, and
   transmittance of 25% or less with respect to ultraviolet light having a wavelength of 388 nm.

* * * * *